United States Patent
Doing et al.

(10) Patent No.: US 7,437,543 B2
(45) Date of Patent: Oct. 14, 2008

(54) REDUCING THE FETCH TIME OF TARGET INSTRUCTIONS OF A PREDICTED TAKEN BRANCH INSTRUCTION

(75) Inventors: Richard William Doing, Raleigh, NC (US); Brett Olsson, Cary, NC (US); Kenichi Tsuchiya, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 256 days.

(21) Appl. No.: 11/109,001

(22) Filed: Apr. 19, 2005

(65) Prior Publication Data

US 2006/0236080 A1    Oct. 19, 2006

(51) Int. Cl.
*G06F 9/40* (2006.01)
(52) U.S. Cl. .................... 712/240; 712/238
(58) Field of Classification Search .............. 712/220, 712/238, 239, 240
See application file for complete search history.

(56) References Cited

U.S. PATENT DOCUMENTS

| | | | |
|---|---|---|---|
| 5,748,976 A | 5/1998 | Taylor | 395/800 |
| 5,842,008 A * | 11/1998 | Gochman et al. | 712/240 |
| 6,230,260 B1 | 5/2001 | Luick | 712/239 |
| 6,289,444 B1 | 9/2001 | Nair | 712/243 |
| 6,332,190 B1 | 12/2001 | Hara | 712/240 |
| 6,526,502 B1 | 2/2003 | Col et al. | 712/239 |
| 6,598,154 B1 | 7/2003 | Vaid et al. | 712/237 |
| 2002/0188833 A1* | 12/2002 | Henry et al. | 712/236 |
| 2002/0188834 A1* | 12/2002 | McDonald et al. | 712/238 |
| 2002/0194464 A1 | 12/2002 | Henry et al. | 712/239 |
| 2003/0212882 A1 | 11/2003 | Bonanno et al. | 712/238 |
| 2004/0168042 A1* | 8/2004 | Lin | 712/207 |

* cited by examiner

*Primary Examiner*—Tonia L. M. Dollinger
(74) *Attorney, Agent, or Firm*—Joscelyn G. Cockburn; Robert A. Voigt, Jr.; Winstead PC (57) ABSTRACT

A method and processor for reducing the fetch time of target instructions of a predicted taken branch instruction. Each entry in a buffer, referred to herein as a "branch target buffer", may store an address of a branch instruction predicted taken and the instructions beginning at the target address of the branch instruction predicted taken. When an instruction is fetched from the instruction cache, a particular entry in the branch target buffer is indexed using particular bits of the fetched instruction. The address of the branch instruction in the indexed entry is compared with the address of the instruction fetched from the instruction cache. If there is a match, then the instructions beginning at the target address of that branch instruction are dispatched directly behind the branch instruction. In this manner, the fetch time of target instructions of a predicted taken branch instruction is reduced.

2 Claims, 9 Drawing Sheets

REDUCING THE FETCH TIME OF TARGET INSTRUCTIONS OF A PREDICTED TAKEN BRANCH INSTRUCTION

TECHNICAL FIELD

The present invention relates to the field of instruction execution in computers, and more particularly to reducing the fetch time of target instructions of a predicted taken branch instruction.

BACKGROUND INFORMATION

Program instructions for a microprocessor are typically stored in sequential, addressable locations within a memory. When these instructions are processed, the instructions may be fetched from consecutive memory locations and stored in a cache commonly referred to as an instruction cache. The instructions may later be retrieved from the instruction cache and executed. Each time an instruction is fetched from memory, a next instruction pointer within the microprocessor may be updated so that it contains the address of the next instruction in the sequence. The next instruction in the sequence may commonly be referred to as the next sequential instruction pointer. Sequential instruction fetching, updating of the next instruction pointer and execution of sequential instructions, may continue linearly until an instruction, commonly referred to as a branch instruction, is encountered and taken.

A branch instruction is an instruction which causes subsequent instructions to be fetched from one of at least two addresses: a sequential address identifying an instruction stream beginning with instructions which directly follow the branch instruction; or an address referred to as a "target address" which identifies an instruction stream beginning at an arbitrary location in memory. A branch instruction, referred to as an "unconditional branch instruction", always branches to the target address, while a branch instruction, referred to as a "conditional branch instruction", may select either the sequential or the target address based on the outcome of a prior instruction. It is noted that when the term "branch instruction" is used herein, the term "branch instruction" refers to a "conditional branch instruction".

To efficiently execute instructions, microprocessors may implement a mechanism, commonly referred to as a branch prediction mechanism. A branch prediction mechanism determines a predicted direction (taken or not taken) for an encountered branch instruction, allowing subsequent instruction fetching to continue along the predicted instruction stream indicated by the branch prediction. For example, if the branch prediction mechanism predicts that the branch instruction will be taken, then the next instruction fetched is located at the target address. If the branch mechanism predicts that the branch instruction will not be taken, then the next instruction fetched is sequential to the branch instruction.

If the predicted instruction stream is correct, then the number of instructions executed per clock cycle is advantageously increased. However, if the predicted instruction stream is incorrect, i.e., one or more branch instructions are predicted incorrectly, then the instructions from the incorrectly predicted instruction stream are discarded from the instruction processing pipeline and the other instruction stream is fetched. Therefore, the number of instructions executed per clock cycle is decreased.

A processor may include a fetch unit configured to fetch a group of instructions, referred to as a "fetch group." The fetch group may be fetched from an instruction cache and upon decoding may be enqueued in an instruction queue for execution. Currently, upon enquing a fetch group containing a branch instruction that is predicted taken in the instruction queue, there is a delay, e.g., two cycle lag, in enquing the subsequent instruction line (i.e., the branched instruction line) in the instruction queue to be executed. This delay results in dead-time in the pipeline where no instructions are executed as illustrated in FIG. 1.

Figure 1:
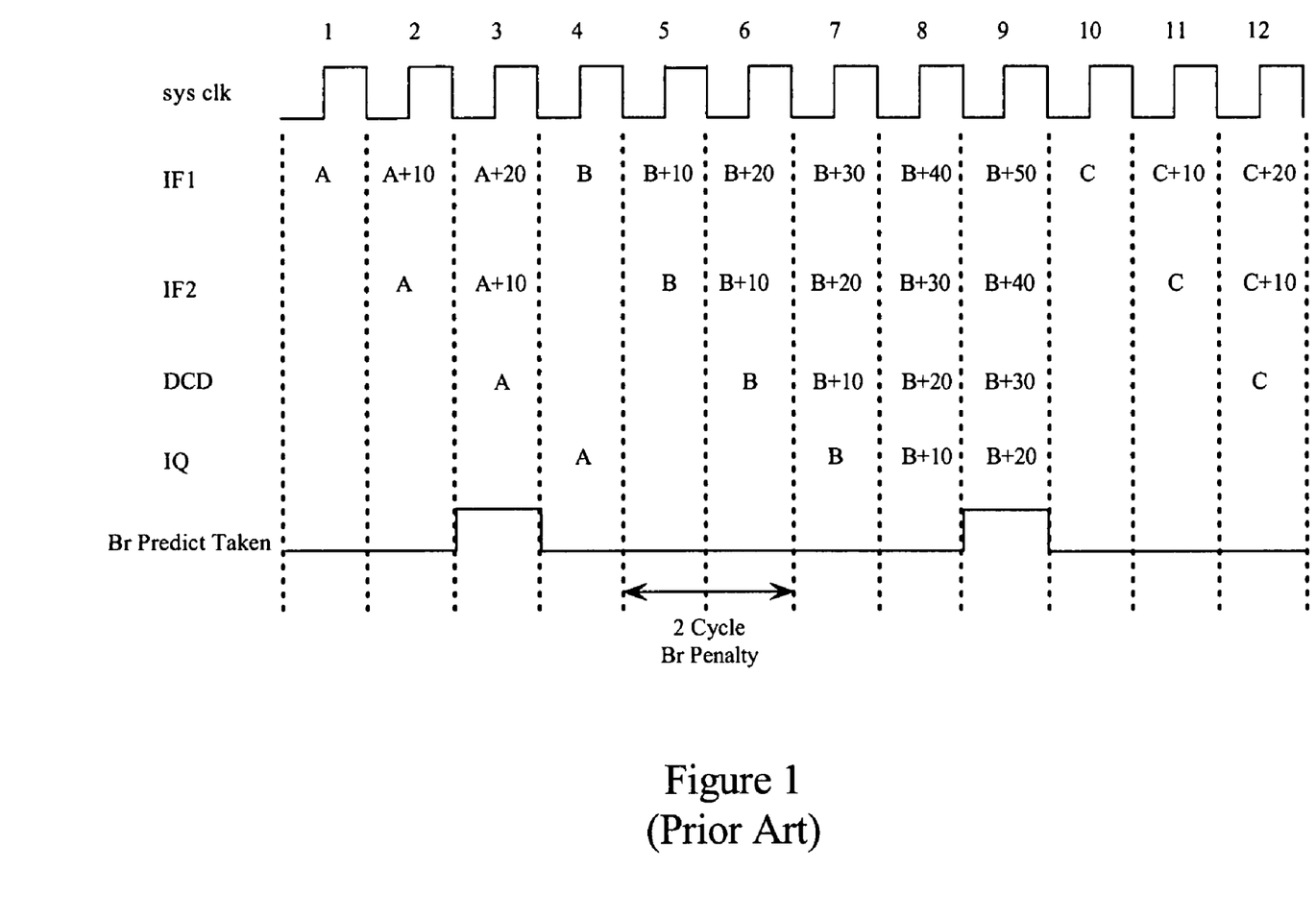
FIG. 1 is a timing diagram illustrating that the instructions at the branch target address are enqueued in an instruction queue two clock cycles after enqueing a fetch group containing the branch instruction.

Referring to FIG. 1, FIG. 1 is a timing diagram illustrating that the instructions at the branch target address (branched fetch group) are enqueued in the instruction queue two cycles after the enqueing of the fetch group containing a branch instruction. As illustrated in FIG. 1, a fetch group, a group of instructions, is fetched in two stages, which are indicated as IF1 and IF2. In the first stage, IF1 fetches fetch groups A, A+10, A+20, B, B+10, B+20, B+30, B+40, B+50, C, C+10 and C+20 in the indicated clock cycles. In the second stage, IF2 continues to fetch fetch groups A, A+10, B, B+10, B+20, B+30, B+40, C and C+10 in the indicated clock cycles.

At the decode stage, which is indicated as "DCD", a branch instruction in the fetch group is determined as predicted taken or not taken. If the decode logic at the decode stage determines that the branch instruction in the fetch group is predicted taken, then the signal identified as "Br Predict Taken" goes high. Otherwise, the signal "Br Predict Taken" remains low. For example, referring to FIG. 1, the decode logic at the decode stage determined that the branch instruction in fetch groups A and B+30 were predicted taken.

In the stage following the decode stage, the instructions are enqueued in the instruction queue in the order to be executed. As illustrated in FIG. 1, fetch group A had a branch instruction that was predicted taken. Further, as illustrated in FIG. 1, the branch instruction branched to fetch group B. Hence, fetch group A was enqueued in the instruction queue followed by enqueing fetch group B. However, there was a two cycle lag between the enqueing of fetch group A and fetch group B. As stated above, this two cycle lag causes dead-time in the pipeline where no instructions are executed.

The two cycle lag as illustrated in FIG. 1 may be exacerbated as the frequency requirements of processors continue to grow. As the frequency requirements for processors continue to grow, i.e., increase in the number of cycles per second the processor operates, there is an increase in the number of clock cycles taken to fetch instructions into the processing pipeline. Hence, there may be an increase in the number of instructions between the top of the fetch pipeline (point at which the initial instruction was fetched) and the point at which the branch prediction can be accomplished. As a result, there may be cases where all the instructions may be dispatched while waiting for a predicted taken branch to be accessed, i.e., waiting to fetch the instructions at the branch target address, from the cache or other memory device. This may result in further dead-time in the pipeline than illustrated in FIG. 1.

By reducing dead-time in the pipeline, i.e., reducing the delay in enqueing instructions following the branch instruction predicted taken in the instruction queue, a greater number of instructions may be processed by a processor in a given period of time.

Therefore, there is a need in the art to reduce the fetch time of target instructions of a predicted taken branch instruction.

SUMMARY

The problems outlined above may at least in part be solved in some embodiments by storing in each entry of a buffer, referred to herein as a "branch target buffer", an address of a branch instruction predicted taken and the instructions beginning at the target address of the branch instruction predicted taken. When an instruction is fetched from the instruction cache, a particular entry in the branch target buffer is indexed using particular bits of the fetched instruction. The address of the branch instruction in the indexed entry is compared with the address of the instruction fetched from the instruction cache. If there is a match and a branch prediction taken indication, the instructions beginning at the target address of that branch instruction are dispatched directly behind the branch instruction. The target instructions (instructions beginning at the target address of the branch instruction) are dispatched directly behind the branch instruction since these are known from the indexed entry in the branch target buffer. By dispatching the target instructions directly behind the branch instruction, the target instructions may be decoded by the decode logic in the following clock cycle as decoding the branch instruction. The target instructions may then be enqueued in the instruction queue in the clock cycle following the enquement of the branch instruction predicted taken. In this manner, the fetch time of target instructions of a predicted taken branch instruction is reduced.

In one embodiment of the present invention, a method for reducing the fetch time of target instructions of a predicted taken branch instruction comprises the step of accessing an instruction cache to fetch an instruction. The method may further comprise indexing into an entry in a buffer using bits from the instruction fetched from the instruction cache. The buffer may comprise a plurality of entries where each of the plurality of entries comprises an address of a branch instruction, a plurality of instructions beginning at a target address of the branch instruction, prediction information for any of the plurality of instructions that are branch instructions and an address of a next fetch group. The method may further comprise comparing an address of the instruction fetched from the instruction cache with the address of the branch instruction in the indexed entry of the buffer. The method may further comprise selecting the plurality of instructions beginning at the target address of the branch instruction in the indexed entry of the buffer if the address of the instruction fetched from the instruction cache matches with the address of the branch instruction in the indexed entry of the buffer.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and processor for reducing the fetch time of target instructions of a predicted taken branch instruction. In one embodiment of the present invention, each entry in a buffer, referred to herein as a "branch target buffer" (BTB), may store an address of a branch instruction predicted taken, the instructions beginning at the target address of the branch instruction predicted taken, branch prediction information and the next fetch address. When an instruction is fetched from the instruction cache, a particular entry in the branch target buffer is indexed using particular bits of the fetched instruction. The address of the branch instruction in the indexed entry is compared with the address of the instruction fetched from the instruction cache. If there is a match and a branch in the fetch group is predicted taken, then the instruction fetched from the instruction cache is considered to have a BTB hit. Further, if there is a BTB hit, the instructions from the branch target buffer beginning at the target address of that branch instruction are dispatched directly behind the branch instruction. The target instructions (instructions beginning at the target address of the branch instruction) are dispatched directly behind the branch instruction since these are accessed from the indexed entry in the branch target buffer. By dispatching the target instructions directly behind the branch instruction, the target instructions may be decoded by the decode logic in the following clock cycle as decoding the branch instruction. The target instructions may then be enqueued in the instruction queue in the clock cycle following the enquement of the branch instruction predicted taken. Also, the subsequent cache line is directly fetched using the next fetch address stored in the branch target buffer. In this manner, the fetch time of target instructions of a predicted taken branch instruction is reduced.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 2:
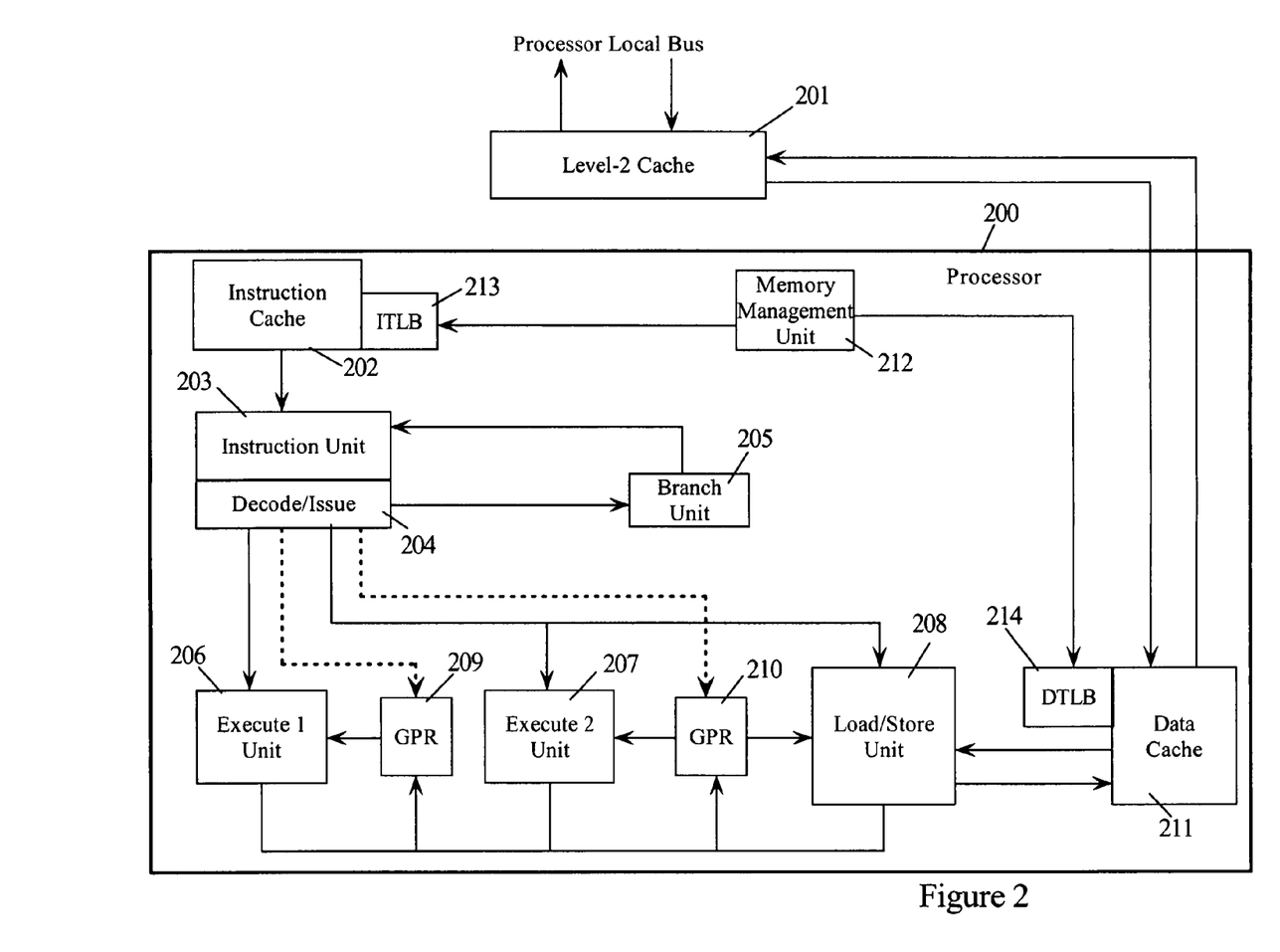
FIG. 2 is a high-level diagram of a processor in accordance with an embodiment of the present invention.

FIG. 2—High-Level Diagram of Processor

FIG. 2 is a high-level diagram of the major components of a processor 200 including certain associated cache structures in accordance with an embodiment of the present invention. Also shown in FIG. 2 is a level-2 cache 201.

Referring to FIG. 2, processor 200 may include a level-1 instruction cache 202, an instruction unit 203, a decode/issue portion 204 of instruction unit 203, a branch unit 205, execution units 206 and 207, a load/store unit 208, General Purpose Registers (GPRs) 209 and 210, a level-1 data cache 211, and memory management units 212, 213 and 214. In general, instruction unit 203 obtains instructions from level-1 instruction cache 202, decodes instructions via decode/issue unit 204 to determine operations to perform, and resolve branch conditions to control program flow by branch unit 205. Execution units 206 and 207 perform arithmetic and logical operations on data in GPRs 209 and 210, and load/store unit 208 performs loads or stores data from/to level-1 data cache 211. Level-2 cache 201 is generally larger than level-1 instruction cache 202 or level-1 data cache 211, providing data to level-1 instruction cache 202 and level-1 data cache 211. Level-2 cache 201 obtains data from a higher level cache or main memory through an external interface such as a processor local bus shown in FIG. 2.

Caches at any level are logically an extension of main memory unlike registers. However, some caches are typically packaged on the same integrated circuit chip as processor 200, and for this reason are sometimes considered a part of processor 200. In one embodiment, processor 200 along with certain cache structures are packaged in a single semiconductor chip, and for this reason processor 200 may be referred to as a "processor core" to distinguish it from the chip containing caches: level-1 instruction cache 202 and level-1 data cache 211. However, level-2 cache 201 may not be in the processor core although it may be packaged in the same semiconductor chip. The representation of FIG. 2 is intended to be typical, but is not intended to limit the present invention to any particular physical or logical cache implementation. It will be recognized that processor 200 and caches could be designed according to system requirements, and chips may be designed differently from represented in FIG. 2.

Referring to FIG. 2, memory management unit 212 may contain the addressing environments for programs. Memory Management Unit (MMU) 212 may be configured to translate/convert effective addresses (EAs) generated by instruction unit 203 or load/store unit 208 for instruction fetching and operand fetching. The instruction-microTLB (ITLB) 213 is a mini MMU to copy a part of MMU contents to improve the instruction EA translation, and the data-micro TLB (DTLB) 214 is for the operand EA translation. Both ITLB 213 and DTLB 214 are provided for MMU acceleration to improve processor performance. FIG. 2 is intended to be typical, but is not intended to limit the present invention to any particular physical or logical MMU implementation.

Instructions from level-1 instruction cache 202 are loaded into instruction unit 203 using ITLB 213 prior to execution. Decode/issue unit 204 selects one or more instructions to be dispatched/issued for execution and decodes the instructions to determine the operations to be performed or branch conditions to be performed in branch unit 205.

Execution units 206 and 207 comprise a set of general purpose registers (GPRs) 209 and 210 for storing data and an arithmetic logic unit (ALU) for performing arithmetic and logical operations on data in GPRs 209 and 210 responsive to instructions decoded by decode/issue unit 204. Again FIG. 2 is intended to be typical, but is not intended to limit the functional capability of execution unit 206 and 207. Execution units 206 and 207 may include a floating point operations subunit and a special vector execution subunit. In addition to the components shown in FIG. 2, execution units 206 and 207 may include special purpose registers and counters, control registers and so forth. In particular, execution units 206 and 207 may include complex pipelines and controls.

Load/store unit 208 is a separate unit but closely interconnected to execution units 206, 207 to provide data transactions from/to data cache 211 to/from GPR 210. In one embodiment, execution unit 207 fetches data from GPR 210 for operand addresses EAs generation to be used by load/store unit 208 to read access data from data cache 211 using DTLB 214 for EA to real address (RA) translation, or to write access data into data cache 211 using DTLB 214 for its EA translation.

As stated in the Background Information section, there may be a multiple clock cycle lag between the enqueing of a fetch group containing a branch instruction predicted taken and the enqueing of the branched fetch group. This delay may be exacerbated as the frequency requirements of processors continue to grow. By reducing dead-time in the pipeline, i.e., reducing the delay in enqueing instructions following the branch instruction predicted taken in the instruction queue, a greater number of instructions may be processed by a processor in a given period of time. Therefore, there is a need in the art to reduce the fetch time of target instructions of a predicted taken branch instruction. A processor configured with a mechanism to reduce the fetch time of target instructions of a predicted taken branch instruction is described below in association with FIG. 3.

Figure 3:
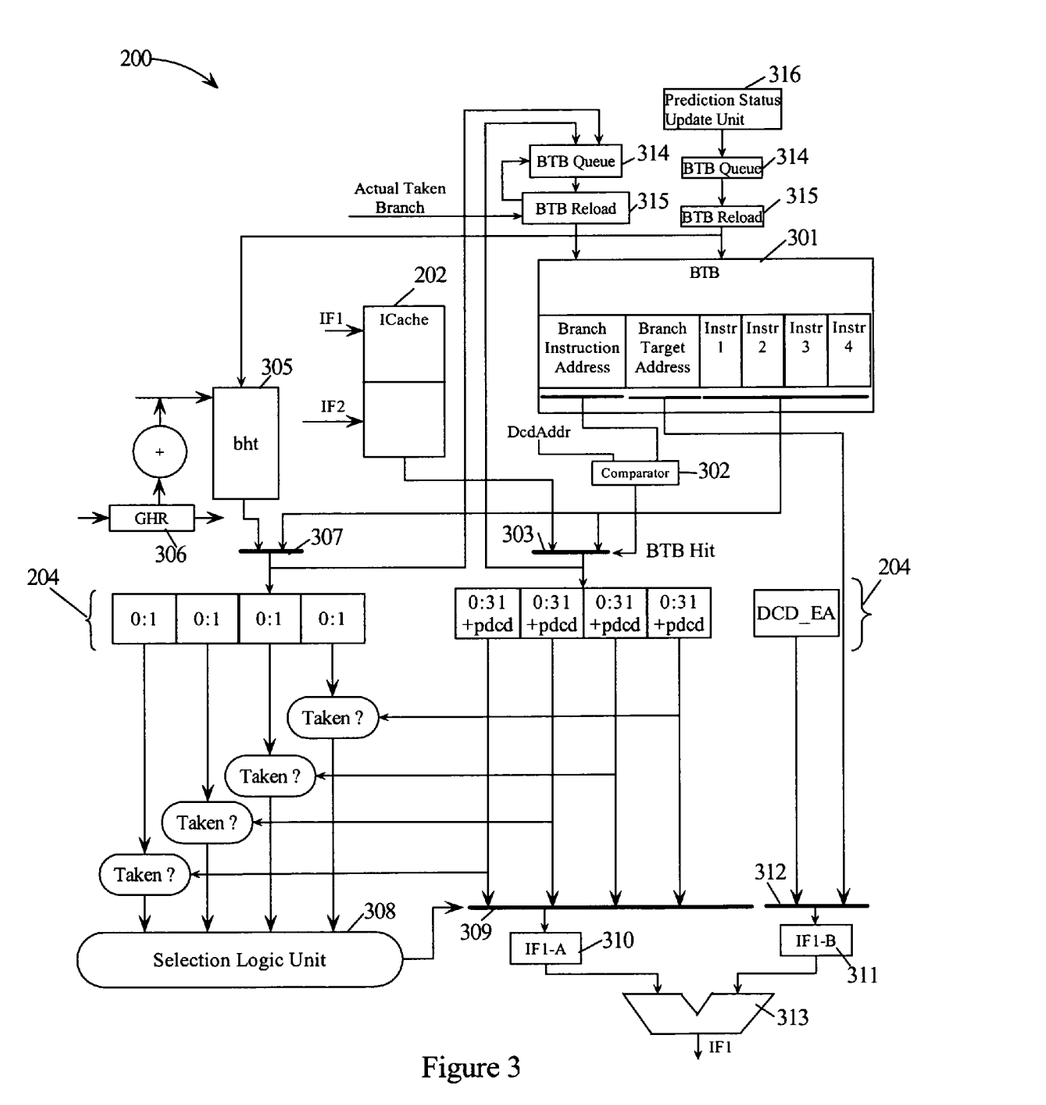
FIG. 3 is an embodiment of the present invention of the processor containing a mechanism to reduce the fetch time of target instructions of a predicted taken branch instruction.

FIG. 3—Processor with Mechanism for Reducing the Fetch Time of Target Instructions of a Predicted Taken Branch Instruction FIG. 3 illustrates an embodiment of the present invention of processor 200 (FIG. 2) containing a mechanism to reduce the fetch time of target instructions of a predicted taken branch instruction.

Referring to FIG. 3, processor 200 includes an instruction cache 202 (FIG. 2) which is accessed in two stages which are designated as instruction fetch IF1 and IF2. During the IF1 and IF2 stages, a fetch group, referring to a group of instructions, is fetched from instruction cache 202. Concurrently with the IF2 stage, a branch target buffer ("BTB") 301 is accessed using designated bits, e.g., bits 23-26, of an instruction in the fetch group fetched from instruction cache 202. This process may be repeated for each instruction in the fetch group fetched from instruction cache 202. BTB 301 includes multiple entries, e.g., sixteen. An embodiment of the present invention of an entry in BTB 301 is illustrated in FIG. 4.

Figure 4:
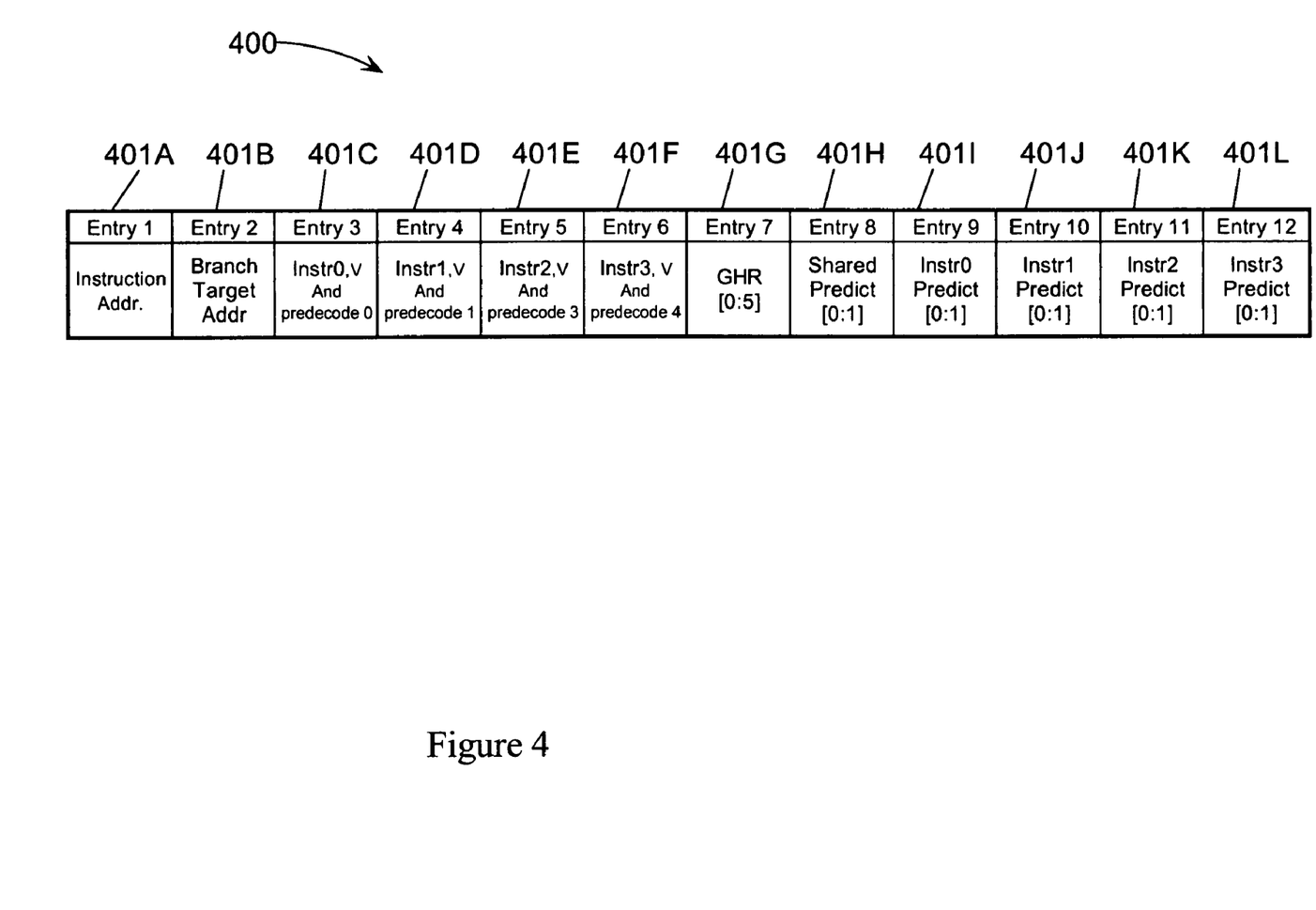
FIG. 4 is an embodiment of the present invention of an entry in the branch target buffer.

FIG. 4 illustrates an embodiment of the present invention of an entry in BTB 301. Referring to FIG. 4, BTB entry 400 may include entries 401A-L. Entry 401A may store bits 0-22 and 27-29 of the branch instruction address. Entry 401B may store an address of the target address (bits 0-29) to generate the next fetch group. Entry 401C may store one of four instructions labeled "Instr0" (bits 0-31) along with its predecode information ("predecode 0") (bits 0-6) and a valid bit ("V"). Similarly, entry 401D may store one of four instructions labeled "Instr1" (bits 0-31) along with its predecode information ("predecode 1") (bits 0-6) and a valid bit ("V"). Entries 401E and 401F may store similar information for instructions labeled "Instr2" and "Instr3", respectively. Instructions Instr0, Instr1, Instr2 and Instr3 begin at a target address of the branch instruction where the target address is stored in entry 401A. Entry 401G may store a copy of the information stored in a global history register ("GHR") 306 (bits 0-5) discussed further below. Such information may be stored in entry 401G in order to ensure that the global history value in BTB 301 kept close track to the information stored in GHR 306. Further, entry 401G may be updated whenever its accompanying prediction bits are updated as discussed further below. Entry 401G is updated along with updating entry 401H (bits 0-1). Entry 401H may be configured to store prediction information ("shared prediction information") that may be used instead of prediction information stored in entries 401I-L when the GHR value stored in entry 401G matches the value stored in GHR 306 as discussed below. Otherwise, the prediction information stored in one of the entries 401I-L (each with bits 0-1) may be used as discussed below. Entry 401I may store prediction information for Instr0 if Instr0 is a branch instruction. Similarly, entries 401J-L may store prediction information for Instr1, Instr2 and Instr3, respectively, if Instr1, Instr2 and Instr3, respectively, is a branch instruction.

Returning to FIG. 3, processor 200 may further include a comparator 302 configured to compare the address of the instruction fetched from instruction cache 202, e.g., bits 0-22 and 27-29 of the fetched instruction, with the address in the indexed entry of BTB 301, e.g., bits 0-23 and 28-29. The result indicates if the address fetched from instruction cache 202 matches the branch address in the indexed entry of BTB 301. When that occurs and the branch is predicted taken, then a "BTB hit" is said to occur.

Processor 200 further includes a selection mechanism 303, e.g., a multiplexer, that receives as inputs, the plurality of instructions, e.g., four instructions, located in the indexed entry in BTB 301 as well as the same number of instructions, e.g., four instructions, that are located at the target address of the branch instruction predicted taken that was fetched from instruction cache 202. For example, if a fetch group fetched from instruction cache 202 includes a branch instruction predicted taken, then a fetch unit (not shown) would fetch the fetch group, e.g., four instructions, located at the target address of the branch instruction predicted taken. These 4 instructions may be fetched form instruction cache 202 and inputted to selection mechanism 303. Furthermore, the four instructions located in the indexed entry in BTB 301 may be inputted to selection mechanism 303. Based on whether there is a BTB hit, selection mechanism 303 would select either the plurality of instructions located in the indexed entry in BTB 301 or the plurality of instructions fetched by the fetch unit (not shown) located at the target address of the branch instruction predicted taken or sequentially from instruction cache 202 if there were no predicted taken branches. If there is a BTB hit, then selection mechanism 303 selects the plurality of instructions located in the indexed entry in BTB 301. Otherwise, selection mechanism 303 selects the instructions fetched from instruction cache 202 by the fetch unit (not shown) located at the target address of the branch instruction predicted taken or the subsequent fetched cache line.

The output of selection mechanism 303 is inputted to decode logic unit 204 (FIG. 2) configured to determine if any of the instructions inputted to decode logic unit 204 are branch instructions. As illustrated in FIG. 3, the output of selection mechanism 303 is four words, each having bits 0-31. These four words are stored in four registers along with predecode information indicated by "pdcd". Decode logic unit 204 may further store the effective address of the address of these four words indicated by "DCD_EA".

Processor 200 further includes a branch history table 305 ("BHT") configured to store prediction information which is used to predict a branch instruction as taken or not taken. Branch history table 305 includes a plurality of entries where each entry stores particular prediction information. Branch history table 305 may be indexed using bits, e.g., bits 17-22, from an instruction fetched during the IF2 stage as well as the bits, e.g., bits 0-5, stored in a global history register ("GHR") 306. Global history register 306 may contain 6-bits of branch history for the last six fetch groups that contained branches. If a branch is predicted "branch taken", then a "1" will be shifted into global history register 306. Otherwise, if a branch is predicted "not taken", then a "0" will be shifted into global history register 306.

The prediction information from the indexed entry of branch history table 305 may be inputted to a selection mechanism 307, e.g., multiplexer. Selection mechanism 307 may also receive the prediction information from the indexed entry in BTB 301. If there is a BTB hit, then selection mechanism 307 selects the prediction information from the indexed entry in BTB 301. By storing the prediction information in the indexed entry in BTB 301, accurate branch prediction can occur on BTB stored branch instructions. That is, accurate branch prediction can occur on any of the target instructions stored in BTB 301 that happen to be branch instructions. To further improve the branch prediction accuracy of those branches in BTB 301, a set of shared (common) prediction bits are stored in entry 401H (FIG. 4) along with a corresponding GHR value stored in entry 401G (FIG. 4). When the GHR value stored in entry 401G matches the content of GHR 306, the shared prediction bits may be used instead of the accompanying prediction bits of the instruction. Otherwise, such prediction information would have to be accessed from branch history table 305 which may result in several extra cycles of delay. Furthermore, selection mechanism 307 selects the prediction information from branch history table 305 if there is not a BTB hit.

This prediction information may be used by decode logic unit 204 which determines whether any of the instructions, e.g., four instructions, selected by selection mechanism 303 were predicted taken. As illustrated in FIG. 3, decode logic unit 204 may include registers storing bits associated with each instruction selected by selection mechanism 303 that indicates whether the associated instruction is a branch instruction predicted taken.

Processor 200 further includes a selection logic unit 308 coupled to decode logic unit 204 and to a selection mechanism 309, discussed below, that is coupled to decode logic unit 204. Selection logic unit 308 may be configured to send a signal to selection mechanism 309 to output the address of the first instruction out of the plurality of instructions received by decode logic unit 204 that is a branch instruction predicted taken. If none of the instructions received by decode logic unit 204 are determined to be branch instructions by decode logic unit 204 or if none of the instructions received by decode logic unit 204 that are determined to be branch instructions are predicted taken, then there is no branch redirection and the next sequential address and instructions from IF2 and instruction cache 202 are loaded into decode logic unit 204. The address and instructions from the decode stage selected by selection mechanism 309 and selection mechanism 312 (described below) are moved to the appropriate register (labeled IF1-A 310 and IF1-B 311) of the address register and later added by adder 313 prior to being stored in an instruction queue (not shown). IF1-A 310 may be used to store the address of the branch instruction; whereas, IF1-B 311 may be used to store the displacement of the branch instruction. By storing the instructions, e.g., four instructions, at the target address of the fetched branch instruction in BTB 301, these instructions may be dispatched and executed directly behind the branch instruction. Hence, by already having these instructions ready to be dispatched and executed, the cycle penalty (dead-time in the pipeline as illustrated in FIG. 1) as discussed in the Background Information section is eliminated as illustrated in FIG. 5.

Figure 5:
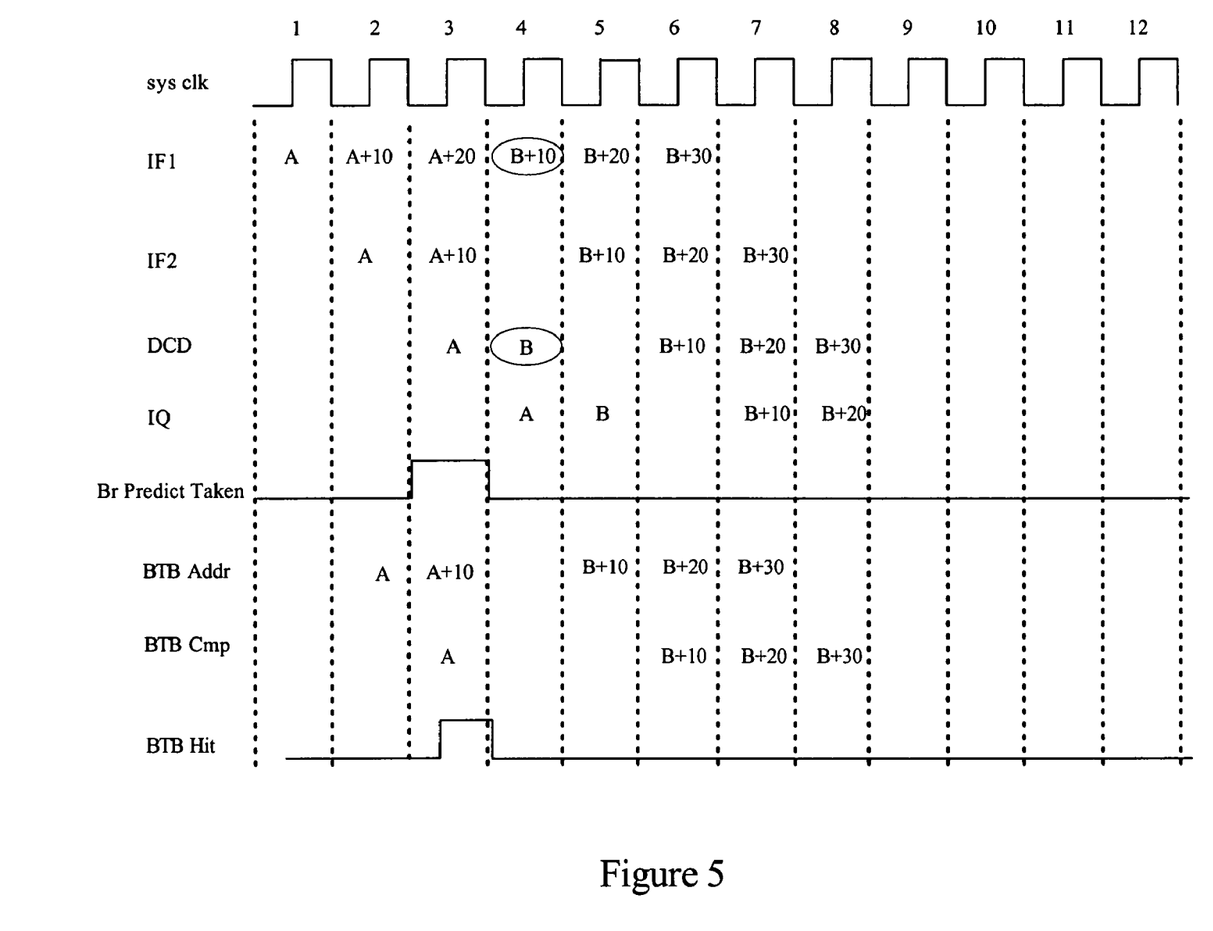
FIG. 5 is a timing diagram illustrating the reduction in the fetch time of target instructions of a predicted taken branch instruction in accordance with an embodiment of the present invention.

Referring to FIG. 5, in conjunction with FIG. 3, FIG. 5 is a timing diagram illustrating that the instructions at the branch target address (branched fetch group) are enqueued in an instruction queue in the following clock cycle after the enqueing of the fetch group containing a branch instruction. As illustrated in FIG. 5, a fetch group is fetched in two stages, which are indicated as IF1 and IF2. In the first stage, IF1 fetches fetch groups A, A+10, A+20, B+10, B+20 and B+30 in the indicated clock cycles. In the second stage, IF2 continues to fetch fetch groups A, A+10, B+10, B+20 and B+30 in the indicated clock cycles.

At the decode stage, which is indicated as "DCD", a branch instruction in the fetch group is determined as predicted taken or not taken. If the decode logic at the decode stage determines that the branch instruction in the fetch group is predicted taken, then the signal identified as "Br Predict Taken" goes high. Otherwise, the signal "Br Predict Taken" goes low. For example, referring to FIG. 5, the decode logic at the decode stage determined that the branch instruction in fetch group A was predicted taken.

In the stage following the decode stage, the instructions are enqueued in the instruction queue in the order to be executed. As illustrated in FIG. 5, fetch group A had a branch instruction that was predicted taken. Further, as illustrated in FIG. 5, the branch instruction branched to fetch group B.

FIG. 5 further illustrates the comparing of the address in the indexed entry of BTB 301 (indicated by "BTB Addr") with the address of the instruction fetched from instruction cache 202 (indicated by "BTB Cmp"). If the address fetched from instruction cache 202 matches the branch address in the indexed entry of BTB 301, then a BTB hit occurs which is indicated by the activation of the signal designated as "BTB Hit". As illustrated in FIG. 5, BTB 301 stores the branch instruction address of the branch instruction in fetch group A. BTB 301 further stores the instructions beginning at a target address of the branch instruction in fetch group A (indicated by fetch group B) as well as the address of the next fetch group (indicated by fetch group B+10).

Referring to FIG. 5, in conjunction with FIG. 3, since BTB 301 stores the instructions beginning at a target address of the branch instruction and the address of the next fetch group, decode logic unit 204 determined that the branch instruction predicted taken in fetch group A branches to fetch group B in the next clock cycle. By storing the instructions beginning at a target address of the branch instruction, the two cycle delay penalty as illustrated in FIG. 1 is eliminated. Further, in the next clock cycle, instructions at the address of the next fetch group (B+10), is fetched in the IF1 stage.

Returning to FIG. 3, processor 200 further includes another selection mechanism 312, e.g., multiplexer, that receives as inputs, the address of the next fetch group from the indexed entry of BTB 301 and the effective address of the branch instruction fetched from instruction cache 202. Selection mechanism 312 selects the address of the next fetch group from the indexed entry of BTB 301 to be outputted if there was a BTB hit. If there is a branch predicted taken but there is no BTB hit, then selection mechanism 312 computes the address of the next fetch group by adding the received effective address of the branch instruction with the displacement in the branch instruction. The outputted address is then inputted into IF1-B 311. An adder 313 adds the address stored in IF1-A 310 with the address stored in IF1-B 311 to be fetched in the subsequent clock cycle in the IF1 stage.

Processor 200 further includes a BTB queue 314 coupled to a BTB reload 315 coupled to BTB 301. BTB queue 314 may be configured to store the instructions located at the target address of the branch instruction fetched from instruction cache 202. BTB queue 314 may further be configured to store prediction information selected from the indexed entry in branch history table 305.

The information stored in BTB queue 314 may be written to BTB 301 by BTB reload unit 315 if there was not a BTB hit and if the branch instruction fetched from instruction cache 202 by IF1 and IF2 was determined to be taken. As stated above, comparator 302 determines if there was a BTB hit whose output is inputted to BTB reload unit 315. Further, BTB Reload 315 unit receives a signal (indicated by "actual taken branch") indicating if the branch instructions predicted taken were actually taken. This signal may be produced towards the end of the branch execution pipeline. A method of updating BTB 301 with instructions and prediction information stored in BTB queue 314 is provided further below in association with FIG. 6.

Furthermore, processor 200 includes a logic unit 316 configured to determine if the prediction bits stored in BTB 301 and in branch history table 305 need to be updated. This logic unit may be referred to as the "prediction status update unit." Prediction status update unit 316 may receive prediction bits that have been updated. These updated prediction bits may be the prediction bits in the indexed entry of BTB 301 that need to be updated. Prediction status update unit 316 may be configured to store such updated prediction bits in BTB queue 314.

If BTB queue 314 stores such updated prediction bits, then BTB reload unit 315 may update such prediction bits in the indexed entry in BTB 301 and in the indexed entry in branch history table 305. The prediction bits are updated whenever it has been determined that the prediction bits in BTB 301 are incorrect, e.g., a branch from a BTB hit is predicted taken in the decode stage and then the branch is determined to be not taken in the execute stage. The prediction needs to be updated in BTB 301 so that the next time the branch is accessed from BTB 301 it will be predicted not taken. A method of updating prediction information in BTB 301 and in branch history table 305 is provided further below in association with FIG. 7.

A description of a method of reducing the fetch time of target instructions of a predicted taken branch instruction using the mechanism of FIG. 3 is provided below in association with FIGS. 6A-B.

Figure 6A:
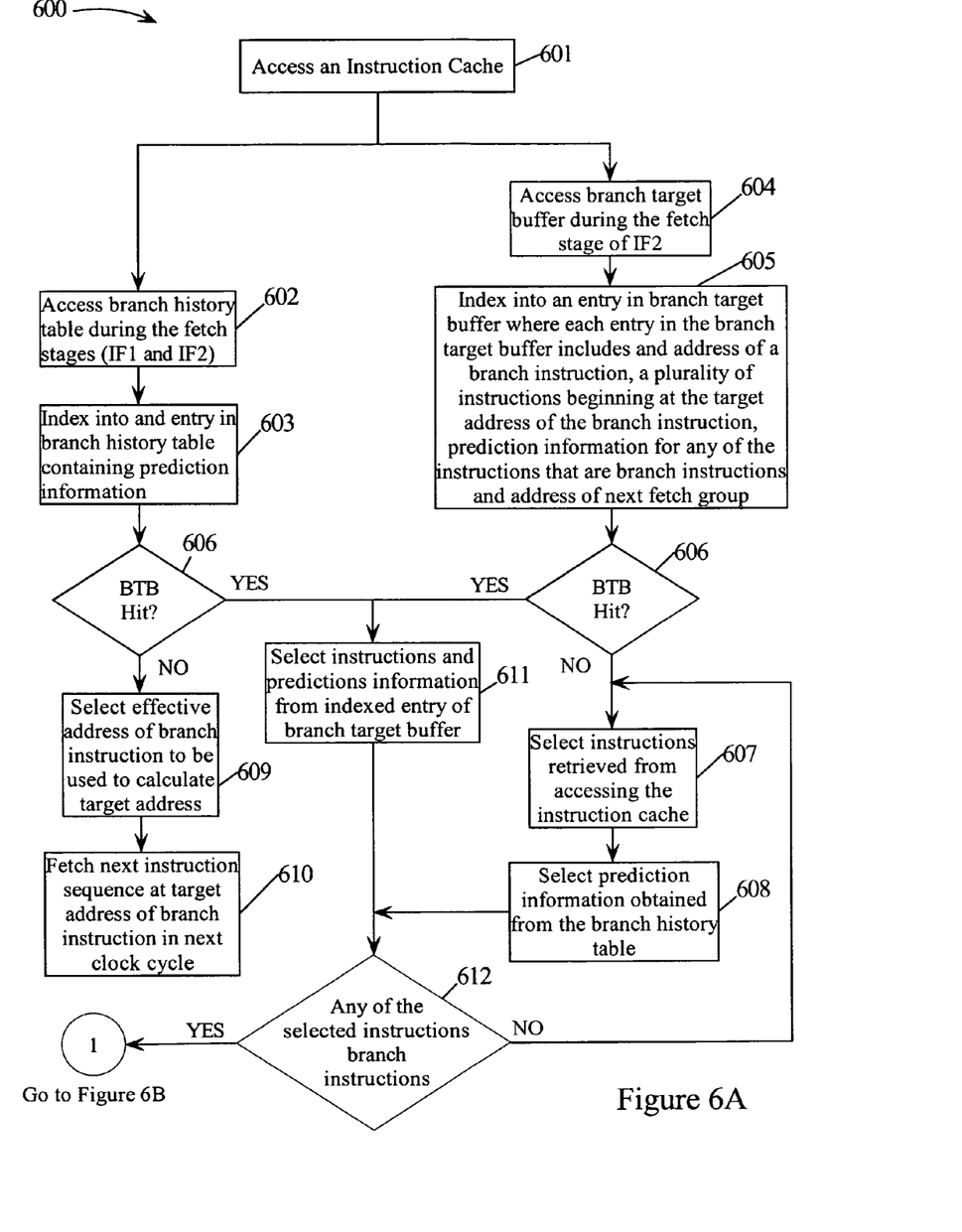
FIGS. 6A-B are a flowchart of a method for reducing the fetch time of target instructions of a predicted taken branch instruction in accordance with an embodiment of the present invention.
Figure 6B:
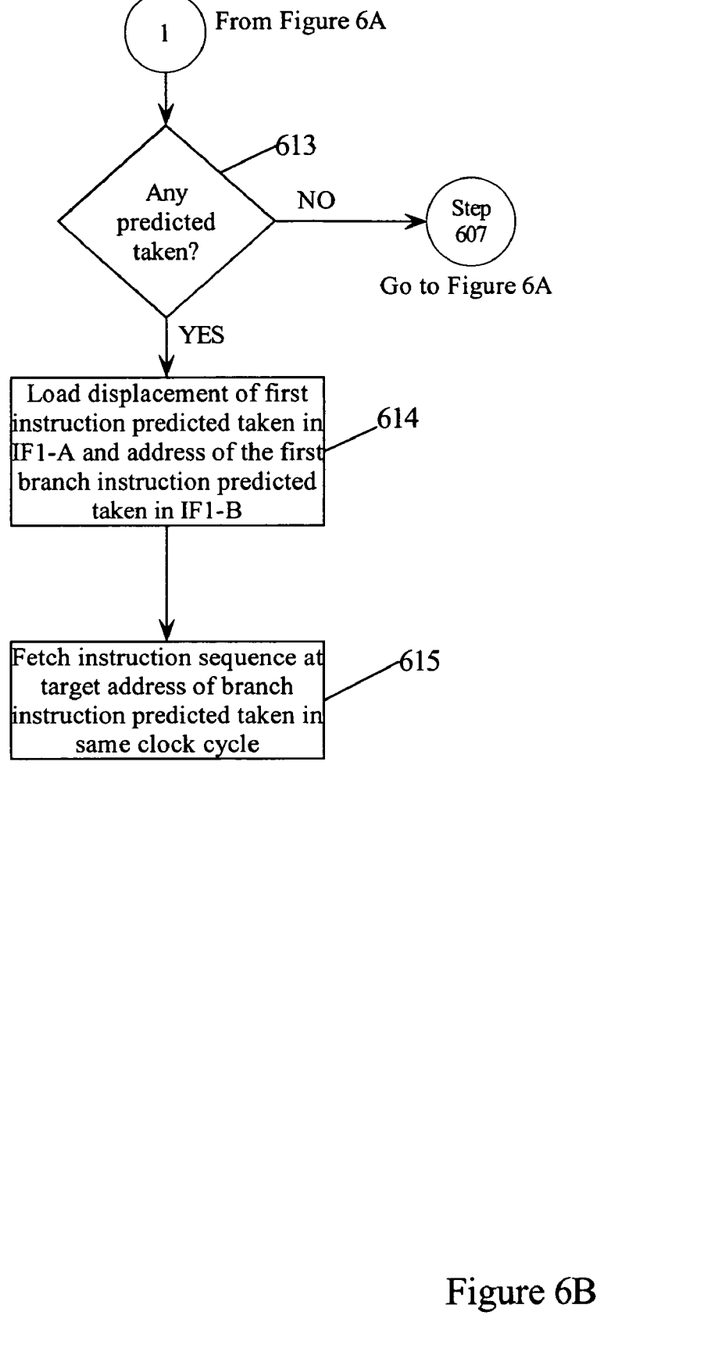

FIGS. 6A-B—Method of Reducing the Fetch Time of Target Instructions of a Predicted Taken Branch Instruction FIGS. 6A-B are a flowchart of one embodiment of the present invention of a method 600 for reducing the fetch time of target instructions of a predicted taken branch instruction.

Referring to FIG. 6A, in conjunction with FIGS. 2-3, in step 601, instruction cache 202 is accessed by a fetch unit (not shown) to fetch a group of instructions ("fetch group") in two stages indicated by IF1 and IF2.

In step 602, branch history table 305 is accessed during the fetch stages IF1 and IF2. In step 603, an entry in branch history table 305 is indexed using bits, e.g., bits 17-22, from the instruction fetched during the IF2 stage as well as the bits, e.g., bits 0-5, stored in global history register 306. The indexed entry may contain prediction information.

In step 604, branch target buffer 301 is accessed during the fetch stage of IF2. In step 605, an entry in branch target buffer 301 is indexed using designated bits, e.g., bits 23-26, of the first instruction in the fetch group fetched from instruction cache 202. The indexed entry includes an address of a branch instruction predicted taken, a plurality of instructions, e.g., 4 instructions, beginning at a target address of the branch instruction, prediction information for any of the plurality of instructions that are branch instructions and an address of the next fetch group.

Upon execution of steps 603 and 605, a determination is made in step 606 as to whether there was a "BTB hit". That is, in step 606, a determination is made as to whether the address fetched from instruction cache 202 matches the branch address in the indexed entry of BTB 301. When that occurs and the branch is predicted taken, a BTB hit is said to occur.

If there is not a BTB hit, then, in step 607, instructions retrieved from accessing instruction cache 202 are selected by selection mechanism 303 as discussed above. In step 608, selection mechanism 307 selects the prediction information obtained from branch history table 305 as discussed above.

Further, if there is not a BTB hit, then, in step 609, selection mechanism 312 selects the effective address of the branch instruction to be used to calculate the target address as discussed above. In step 610, the next instruction sequence at the target address of the branch instruction is fetched in the next clock cycle.

If, however, there is a BTB hit, then, in step 611, selection mechanism 303 selects the instructions obtained from the indexed entry of branch target buffer 301 in step 605. Further, in step 611, selection mechanism 307 selects the prediction information obtained from the indexed entry of branch target buffer 301 in step 605.

Upon selecting instructions and prediction information from the indexed entry of branch target buffer 301 or upon selecting the instructions from instruction cache 202 and selecting the prediction information from the indexed entry of branch history table 305, a determination is made by decode logic unit 204 in step 612 as to whether any of the instructions selected in steps 611 or 607 are branch instructions.

If none of these instructions are branch instructions, then instructions retrieved from accessing instruction cache 202 are selected by selection mechanism 303, as discussed above, in step 607.

Referring to FIG. 6B, in conjunction with FIGS. 2-3, if, however, one of these instructions are branch instructions, then, in step 613, a determination is made by decode logic unit 204 as to whether the branch instruction is predicted taken. If none of the branch instruction(s) are predicted taken, then instructions retrieved from accessing instruction cache 202 are selected by selection mechanism 303, as discussed above, in step 607.

If, however, there is a branch instruction predicted taken, then, in step 614, selection mechanism 309 loads a displacement of the first branch instruction predicted taken in IF1-A 310 and loads an address of the first branch instruction predicted taken in IF1-B 311. In step 615, the instruction sequence at the target address of the branch instruction predicted taken is fetched in the same clock cycle as illustrated in FIG. 5.

It is noted that method 600 may include other and/or additional steps that, for clarity, are not depicted. It is further noted that method 600 may be executed in a different order presented and that the order presented in the discussion of FIGS. 6A-B are illustrative. It is further noted that certain steps in method 600, e.g., steps 602-605; steps 607-609, may be executed in a substantially simultaneous manner.

As stated above, a description of a method of updating BTB 301 such as by updating BTB 301 with the instructions and prediction information stored in BTB queue 314 is provided below in association with FIG. 7.

Figure 7:
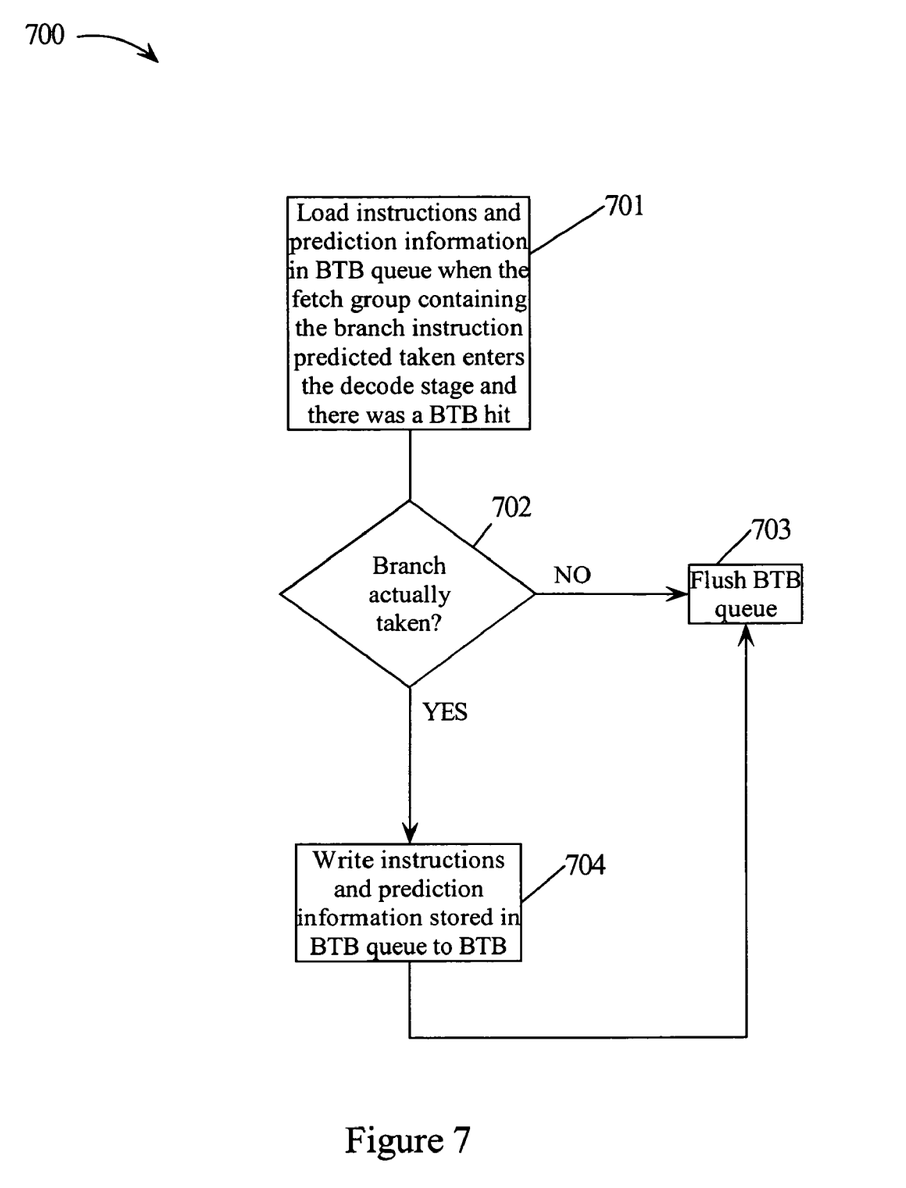
FIG. 7 is a flowchart of a method for updating the branch target buffer with instructions and prediction information stored in the branch target buffer queue in accordance with an embodiment of the present invention.

FIG. 7—Method of Updating Branch Target Buffer

FIG. 7 is a flowchart of one embodiment of the present invention of a method 700 of updating BTB 301 (FIG. 3) with the instructions and prediction information stored in BTB queue 314 (FIG. 3).

Referring to FIG. 7, in conjunction with FIGS. 2-3, in step 701, the instructions and prediction information are loaded in branch target buffer (BTB) queue 314 when the fetch group containing the branch instruction predicted taken enters the decode stage and there was a BTB hit.

In step 702, a determination is made by BTB reload 315 as to whether the branch instruction fetched by instruction cache 202 was actually taken. BTB reload 315 may receive a signal indicating whether the branch instruction predicted taken was actually taken at the time the branch instruction is executed as described above. If the branch instruction fetched by instruction cache 202 was not actually taken, then BTB queue 314 is flushed in step 703.

If, however, the branch instruction fetched by instruction cache 202 was actually taken, then, in step 704, the instructions and prediction information stored in BTB queue 314 are written to BTB 301. Upon writing the instructions and prediction information stored in BTB queue 314 to BTB 301, BTB queue 314 is flushed in step 703.

It is noted that method 700 may include other and/or additional steps that, for clarity, are not depicted. It is further noted that method 700 may be executed in a different order presented and that the order presented in the discussion of FIG. 7 is illustrative. It is further noted that certain steps in method 700 may be executed in a substantially simultaneous manner.

As stated above, a description of a method of updating prediction information in BTB 301 and in branch history table 305 is provided further below in association with FIG. 8.

Figure 8:
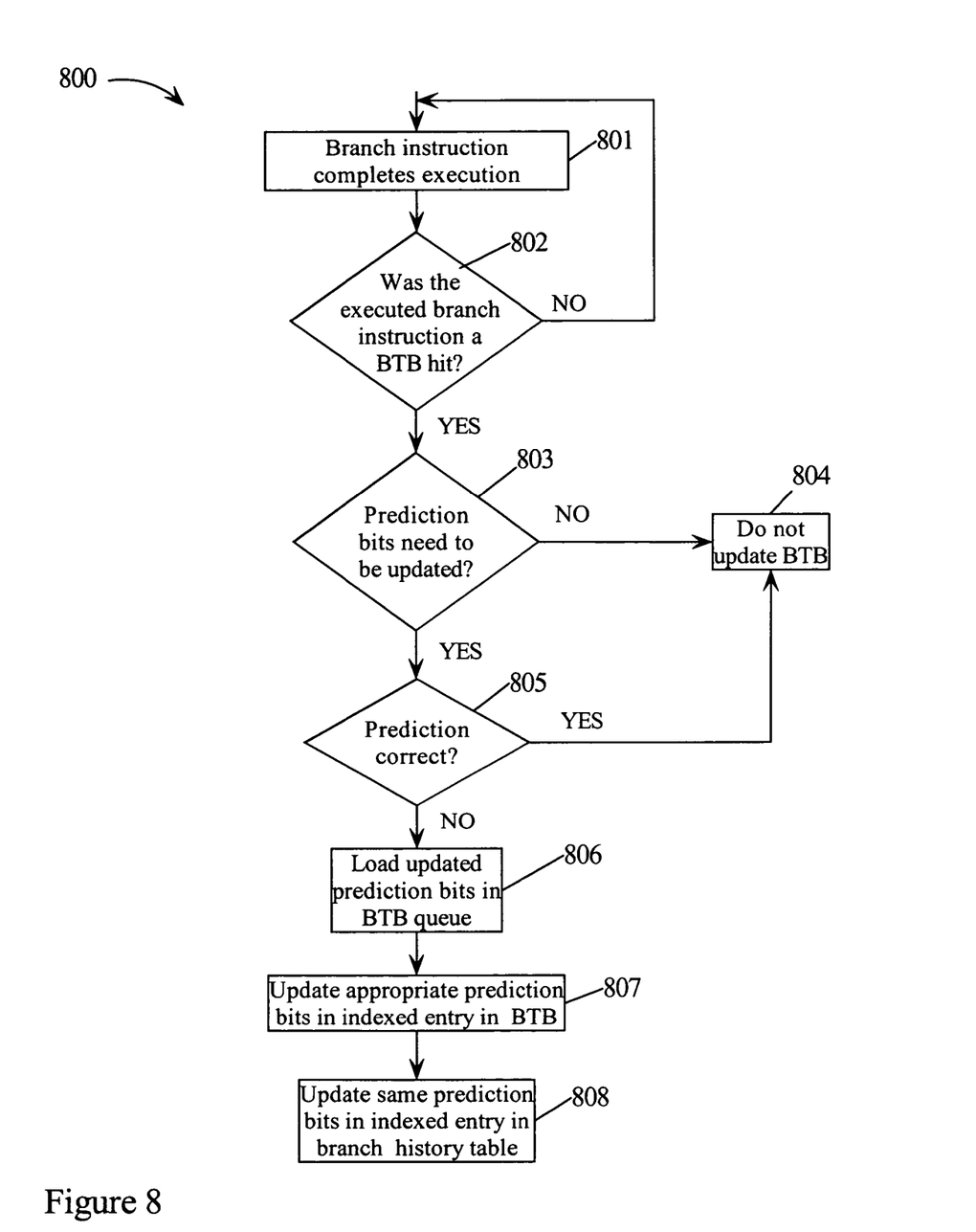
FIG. 8 is a flowchart of a method for updating the branch target buffer and the branch history table with updated prediction information in accordance with an embodiment of the present invention.

FIG. 8—Method for Updating Prediction Information

FIG. 8 is a flowchart of one embodiment of the present invention of a method 800 of updating the prediction information stored in BTB 301 (FIG. 3) and branch history table 305 (FIG. 3).

Referring to FIG. 8, in conjunction with FIGS. 2-3, in step 801, the branch instruction fetched from instruction cache 202 completes execution. In step 802, a determination is made by comparator 303 as to whether the executed branch instruction was a BTB hit.

If the executed branch instruction was not a BTB hit, then the next branch instruction fetched from instruction cache 202 completes execution in step 801.

If, however, the executed branch instruction was a BTB hit, then, in step 803, a determination is made by prediction status update unit 316 as to whether the prediction bits in BTB 301 and branch history table 305 need to be updated. If prediction status update unit 316 determines that the prediction bits do not need to be updated (explanation of how prediction status update unit 316 determines whether the prediction bits were updated is provided above), then, in step 804, BTB 301 and branch history table 305 are not updated. If, however, prediction status update unit 316 determines that the prediction bits need to be updated, then, in step 805, prediction status update unit 316 determines if the prediction is correct.

If the prediction is correct, then, BTB 301 and branch history table 305 are not updated in step 804. If, however, the prediction is incorrect, then, in step 806, prediction status update unit 316 loads the updated prediction bits in BTB queue 314. In step 807, BTB reload 315 updates the appropriate prediction bits in the indexed entry (entry indexed in step 605 of FIG. 6A) in BTB 301. In step 808, BTB reload 315 updates the same prediction bits in the indexed entry (entry indexed in step 603 of FIG. 6A) in branch history table 305.

It is noted that method 800 may include other and/or additional steps that, for clarity, are not depicted. It is further noted that method 800 may be executed in a different order presented and that the order presented in the discussion of FIG. 8 is illustrative. It is further noted that certain steps in method 800 may be executed in a substantially simultaneous manner.

Although the method and processor are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

We claim:

1. A method for reducing the normal fetch time of a predicted taken branch instruction comprising the steps of:

accessing an instruction cache to fetch an instruction;

indexing into an entry in a buffer using bits from said instruction fetched from said instruction cache, wherein said buffer comprises a plurality of entries, wherein each of said plurality of entries comprises an address of a branch instruction, a plurality of instructions beginning at a target address of said branch instruction, prediction information for any of said plurality of instructions that are branch instructions and an address of a next fetch group;

comparing an address of said instruction fetched from said instruction cache with said address of said branch instruction in said indexed entry of said buffer;

selecting said plurality of instructions beginning at said target address of said branch instruction in said indexed entry of said buffer if said address of said instruction fetched from said instruction cache matches with said address of said branch instruction in said indexed entry of said buffer;

determining if any of said plurality of instructions selected is a branch instruction; and loading a displacement and an address of a first of said plurality of instructions selected in a first and a second register, respectively, wherein said first of said plurality of instructions selected is a branch instruction predicted taken.

2. The method as recited in claim 1 further comprising the steps of:

updating said prediction information stored in said indexed entry in said buffer if a prediction of said first of said plurality of instructions selected is incorrect; and updating said prediction information stored in a branch history table if said prediction of said first of said plurality of instructions selected is incorrect.

* * * * *